United States Patent
Skinner et al.

(10) Patent No.: US 7,918,950 B2
(45) Date of Patent: Apr. 5, 2011

(54) LOW FIBER CALCINATION PROCESS FOR MAKING GYPSUM FIBERBOARD

(75) Inventors: Marsha S. Skinner, Port Clinton, OH (US); Robert G. Lange, Villa Park, IL (US); Douglas Blackburn, Port Clinton, OH (US)

(73) Assignee: United States Gypsum Company, Chicago, IL (US)

( * ) Notice: Subject to any disclaimer, the term of this patent is extended or adjusted under 35 U.S.C. 154(b) by 479 days.

(21) Appl. No.: 11/962,031

(22) Filed: Dec. 20, 2007

(65) Prior Publication Data

US 2009/0159173 A1 Jun. 25, 2009

(51) Int. Cl.
B32B 3/18 (2006.01)

(52) U.S. Cl. .............. 156/42; 156/39; 106/780

(58) Field of Classification Search .......... 156/42; 106/772, 778, 779, 780
See application file for complete search history.

(56) References Cited

U.S. PATENT DOCUMENTS

| | | |
|---|---|---|
| 2,076,349 A | 4/1937 | Porter et al. |
| 2,310,216 A | 2/1943 | Crandell |
| 2,803,575 A | 8/1957 | Riddell et al. |
| 4,199,366 A | 4/1980 | Schaefer et al. |
| 4,252,568 A | 2/1981 | Bounini |
| 4,306,911 A | 12/1981 | Gordon et al. |
| 4,339,273 A | 7/1982 | Meier et al. |
| 4,351,867 A | 9/1982 | Mulvey et al. |
| 4,392,896 A | 7/1983 | Sakakibara |
| 4,544,424 A | 10/1985 | Take et al. |
| 4,840,688 A | 6/1989 | Vogt |
| 5,041,333 A | 8/1991 | Conroy |
| 5,135,805 A | 8/1992 | Sellers et al. |
| 5,298,071 A | 3/1994 | Vondran |
| 5,320,677 A * | 6/1994 | Baig ........................ 106/780 |
| 5,401,588 A | 3/1995 | Garvey et al. |
| 5,558,710 A | 9/1996 | Baig |
| 5,601,888 A | 2/1997 | Fowler |
| 5,632,848 A | 5/1997 | Richards et al. |
| 5,637,362 A | 6/1997 | Chase et al. |
| 5,723,226 A | 3/1998 | Francis et al. |
| 5,817,262 A | 10/1998 | Englert |
| 6,010,596 A | 1/2000 | Song |
| 6,221,521 B1 | 4/2001 | Lynn et al. |
| 6,268,042 B1 | 7/2001 | Baig |
| 6,406,779 B1 | 6/2002 | Carbo et al. |
| 6,409,825 B1 | 6/2002 | Yu et al. |
| 6,508,895 B2 | 1/2003 | Lynn et al. |
| 6,531,210 B1 | 3/2003 | Englert |

(Continued)

*Primary Examiner* — Kat Wyrozebski
*Assistant Examiner* — Daniel Lee
(74) *Attorney, Agent, or Firm* — Novak Druce + Quigg LLP; Philip T. Petti; Pradip K. Sahu (57) ABSTRACT

An energy efficient method for making a gypsum cellulose fiberboard comprising adding a first portion of cellulose fiber to gypsum before the gypsum and cellulose fiber are co-calcined in a reactor, adding a second portion of cellulose fiber to the slurry after it leaves the reactor to form a second slurry, depositing the slurry to form a mat, dewatering the mat, rehydrating the mat and then finishing the mat to form a final gypsum cellulose fiberboard. A reduction of up to about 40% to 50% of steam energy used can be achieved when the second portion of added cellulose fiber is 50% or more of the total cellulose fiber used in the final board compared to gypsum cellulose board made with the same ingredients but when all of the fiber is added to the gypsum prior to the reactor.

18 Claims, 2 Drawing Sheets

U.S. PATENT DOCUMENTS

| | | |
|---|---|---|
| 6,706,128 B2 | 3/2004 | Sethuraman |
| 7,056,460 B2 | 6/2006 | Englert |
| 7,172,403 B2 | 2/2007 | Burke |
| 7,273,579 B2 | 9/2007 | Miller et al. |
| 2003/0044630 A1 | 3/2003 | Leclercq |
| 2003/0084980 A1 | 5/2003 | Seufert et al. |
| 2004/0231916 A1 | 11/2004 | Englert et al. |
| 2005/0161853 A1 | 7/2005 | Miller et al. |
| 2006/0243171 A1 | 11/2006 | Yu et al. |
| 2006/0278132 A1 | 12/2006 | Yu et al. |
| 2006/0278133 A1 | 12/2006 | Yu et al. |
| 2007/0044687 A1 | 3/2007 | Blackburn et al. |
| 2007/0048490 A1 | 3/2007 | Yu et al. |
| 2007/0048549 A1 | 3/2007 | Song et al. |
| 2007/0056478 A1 | 3/2007 | Miller et al. |
| 2007/0102237 A1 | 5/2007 | Baig |

\* cited by examiner

LOW FIBER CALCINATION PROCESS FOR MAKING GYPSUM FIBERBOARD

FIELD OF THE INVENTION

This invention relates generally to an improved gypsum cellulose fiber composite panels suitable for building applications for wallboard ceiling applications, framing and sheathing elements, siding elements, and other building construction types having significant lower density and more flexibility while significantly reducing the amount of total cellulose fiber that is added to gypsum to react with gypsum in a reactor for calcining the gypsum before additional cellulose fiber slurry is added to the calcined gypsum and cellulose fiber slurry, the slurry is formed into a mat, that is dewatered, rehydrated into gypsum, and then dried to form a fiber reinforced gypsum fiberboard panel (hereinafter referred to as "gypsum fiber board panels" or "GFP").

BACKGROUND OF THE INVENTION

Gypsum fiber board panels have been used in the construction industry to form the interior and exterior walls of residential and/or commercial structures. However, a drawback of such conventional panels is that they do not have sufficient flexural toughness to the extent that such panels may be comparable to wood-based panels such as plywood or oriented strand board (OSB).

Building structures during their lifetimes are subjected to a variety of impact loads (e.g., hail damage, or damage from objects hurled at the buildings due to tornados or hurricanes). Not all building sheathing panels are sufficiently tough to withstand such impact loads. Where it is necessary to demonstrate impact load resistance, the sheathing panels are measured to determine the impact the panel can resist without failure.

Flexural toughness as characterized in this specification is measured as equal to the total area under the flexural load versus deflection curve for a specimen loaded in three-point bending.

One example of flexural toughness is measured as the total area under the load versus deflection curve for a flexural specimen loaded in a 3-point bending according to ASTM D1037 test method.

Wood-based panels achieving significant flexural toughness usually are plywood or oriented strand board (OSB), which consist of wood veneers or large chips that are glued together. These panels can provide flexural toughness, but each is combustible and in many cases other than marine plywood, these panels are not durable when exposed to water. A panel made of hydraulic cement will resist water, but is much heavier than the wood panels. It is believed that there is no panel currently available at a comparable cost which can provide the flexural toughness of the present invention, while avoiding the deficiencies of plywood or OSB panels.

Furthermore, the need for gypsum fiber panels configured to behave in the construction environment similar to plywood and OSB means the panels are nailable and can be cut or worked using conventional saws and other conventional carpentry tools.

The panel should be capable of being cut with the circular saws used to cut wood. The panel should also be capable of being fastened to framing with nails or screws.

The panel should be dimensionally stable when exposed to water, i.e., it should expand as little as possible, preferably less than 0.1% as measured by ASTM C 1278. The Standard specification for some gypsum fiberboard panels is listed at 5% moisture uptake in a 2 hour soak, although other gypsum fiber board panel products can have as much as 10% moisture uptake in a 2 hour soak test. The panel should not be biodegradable or subject to attack by insects or rot. However, the panel should provide a bondable substrate for exterior finish systems.

The flexural strength of a 0.5 inch (12.7 mm) thick gypsum fiberboard panels (GFP) having a density of about 714 kg/m$^3$ (50 lb/ft$^3$) to about 1000 kg/m$^3$ (70 lb/ft$^3$) is at least 5.2 MPa (750 psi), and preferably greater than 6.9 MPa (1000 psi) as measured by the ASTM D1037 test.

It should be evident that the currently available gypsum fiber based and wood-based products and composites meet some, but not all, of the above performance characteristics. In particular, there is a need for improved gypsum fiber based panels that are lightweight having improved flexural toughness and which exceed the capability of the currently-used gypsum fiber board and wood-based by providing non-combustibility and water durability.

Although glass fibers have been used to reinforce gypsum board and gypsum fiber board, other fibers have been suggested to reinforce gypsum board, such as metal fibers, wood or paper fibers, carbon fibers, or polymer fibers.

U.S. Pat. No. 5,320,677 to M. Baig, incorporated herein by reference in its entirety, discloses a composite gypsum/wood fiber (GWF) material product and a process for forming the product in which a dilute slurry of gypsum particles and cellulosic fibers are heated under pressure to convert the raw gypsum to calcium sulfate hemihydrate by calcining the gypsum in the presence of wood fibers. The dissolved calcium sulfate wets the voids in the fiber and the resulting hemihydrate eventually forms crystals in situ in the voids of the cellulose fiber. However, it would be desirable to further improve the GWF to reduce the density and improve the flexibility of the panel, reduce the amount of unreacted hemihydrate that can not be readily rehydrated to gypsum in the GWF production process, and reduce the setting time of the panel while significantly reducing the amount of steam energy required to calcine the gypsum to calcium sulfate hemihydrate.

U.S. Pat. No. 6,508,895 to Lynn et al, incorporated herein by reference, discloses a paperless gypsum/fiberboard which has improved impact resistance compared to gypsum/fiberboard by use of a process wherein a multilayer gypsum/fiber board is formed having a flexible mesh, preferably fiberglass mesh embedded in the backside of the board, to provide improved impact resistance. In the process, the mesh is fed into the forming area of the panel before the panel is pressed prior to drying. Optionally, a second layer of mesh can be embedded in the top layer of the gypsum/fiberboard.

U.S. Pat. No. 4,199,366 A to Schaefer et al., incorporated herein by reference, discloses a fiber-reinforced cement material having short polyvinyl alcohol fibers in an amount of at least 2 volume % based on the total volume of the material. These fibers have an elongation at break of between about 4 and 8% and a modulus of more than 130 g/dtex. A process for the preparation of the material is also disclosed.

U.S. Pat. No. 4,306,911 A to Gordon et al., incorporated herein by reference, discloses a method for the production of a fiber-reinforced hydraulically obtained setting material.

U.S. Pat. No. 4,339,273 A to Meier et al., incorporated herein by reference, discloses a process for producing a fiber-reinforced, hydraulically setting composition, the composition produced, and the use thereof.

U.S. Pat. No. 5,298,071 A to Vondran, incorporated herein by reference, discloses a fiber-hydratable cement composition comprising a uniform dispersion interground fiber in hydratable cement powder.

U.S. Pat. No. 5,817,262 A to Englert, incorporated herein by reference in its entirety, discloses a process for making a gypsum wood fiber board with improved moisture resistance through addition of an aqueous siloxane emulsion to the calcined gypsum and wood fiber slurry at a temperature above the point at which the hemihydrate will rehydrate to gypsum.

U.S. Pat. No. 6,010,596 to Song, incorporated herein by reference in its entirety, discloses a process for making a moisture resistant gypsum wood fiberboard by adding a wax emulsion to calcined gypsum and wood fiber slurry before the calcium sulfate hemihydrate will rehydrate to gypsum.

U.S. Pat. No. 6,221,521 B1 to Lynn, incorporated herein by reference in its entirety, discloses a three layer paperless fiber reinforced gypsum/fiberboard product that is non-combustible and which uses no more than 3% by weight organic material in its core layer and 10-30% paper reinforcing fiber added to calcined gypsum in its surface layers.

U.S. Pat. No. 6,268,042 B1 to Baig, incorporated herein by reference in its entirety, discloses a high strength low density fiber board panel for use in furniture made from mineral wool, lightweight aggregate, 20 to 35% cellulose fiber, binder and up to 23% gypsum solids.

U.S. Pat. No. 6,406,779 B1 to Carbo et al., incorporated herein by reference in its entirety, discloses a paperless gypsum/fiberboard made with calcined gypsum and added cellulose fiber with improved surface characteristics by addition of a heat curable primer comprising an aqueous emulsion of a film forming polymeric material.

U.S. Pat. No. 6,508,895 B2 to Lynn et al., incorporated herein by reference in its entirety, discloses a paperless multilayered gypsum fiberboard with improved impact resistance that has a fiberglass mesh embedded in its back side.

U.S. Pat. No. 6,531,210 B2 and U.S. Pat. No. 7,056,460 to Englert, incorporated herein by reference in its entirety, discloses a process for preparing an improved gypsum/wood fiberboard by addition of a stable methylenediphenyldiisocyante emulsion to an aqueous slurry of calcined gypsum and wood fiber just prior to the slurry being fed to the headbox in the process described in U.S. Pat. No. 5,558,710 A, above.

U.S. 2005/0161853 to Miller et al., incorporated herein by reference in its entirety, discloses an improved process for calcining gypsum and cellulose fiber in the manufacture of gypsum/cellulose fiber products by addition of crystal modifiers prior to heating to reduce the time and temperature necessary to complete calcination or to increase the aspect ratio of the acicular crystals formed during calcination process.

US. 2006/0243171 to Yu et al., incorporated herein by reference in its entirety, discloses a wet gypsum accelerator comprising an organic phosphonic compound, a phosphate-containing compound and mixtures thereof for increasing the rehydration of calcined gypsum.

US2007/0056478 to Miller et al., incorporated herein by reference in its entirety, discloses an improved method for making a water resistant gypsum fiberboard that comprises adding a silicone compound and magnesium oxide to a calcined slurry of calcium sulfate hemihydrate and cellulose fiber after the calcination step and before dewatering the slurry to form a filter cake.

SUMMARY OF THE INVENTION

The present invention relates to an improved gypsum fiberboard and an energy efficient process with significantly faster setting times than current manufacturing processes for gypsum fiberboard and which produces an improved cellulose fiber-reinforced gypsum fiberboard having essentially no unhydrated hemihydrate (hereinafter referred to as "UHH") that can not be readily rehydrated to gypsum without addition of water. Although UHH can be rehydrated to gypsum after drying by addition of water, the amount of UHH is particularly important since the resulting GFP made with this rehydrated UHH will have less strength than panels which are made from hemihydrate that has been rehydrated to gypsum prior to the drying of the mat. The improved gypsum fiberboard has a lower density more flexibility and a significantly reduced setting time than gypsum fiberboard which is made with the same amount of cellulose fiber but which adds all of the cellulose fiber to the gypsum before the gypsum is calcined.

In the process, uncalcined gypsum and a first portion of the host particle e.g. paper fiber, are mixed together with sufficient liquid to form dilute slurry which is then heated under pressure with steam to calcine the gypsum, converting it to an alpha calcium sulfate hemihydrate. While the micro-mechanics of the invention are not fully understood, it is believed that the dilute slurry menstruum wets out the host particle, carrying dissolved calcium sulfate into the voids therein. The hemihydrate eventually nucleates and forms crystals, predominantly acicular crystals, and in-situ in and about the voids of the host particle. Crystal modifiers can be added to the slurry if desired. The resulting composite is a host particle physically interlocked with calcium sulfate crystals. This interlocking not only creates a good bond between the calcium sulfate and stronger host particle, but prevents migration of the calcium sulfate away from the host particle when the hemihydrate is subsequently rehydrated to the dihydrate (gypsum).

A plurality of such composite particles form a material mass which can be compacted, pressed into boards, cast, sculpted, molded, or otherwise formed into desired shape prior to final set. After final set, the composite material can be cut, chiseled, sawed, drilled and otherwise machined. Moreover, it exhibits the desirable fire resistance and dimensional stability of the gypsum plus certain enhancements (particularly strength and toughness) contributed by the substance of the host particle.

Figure 2:
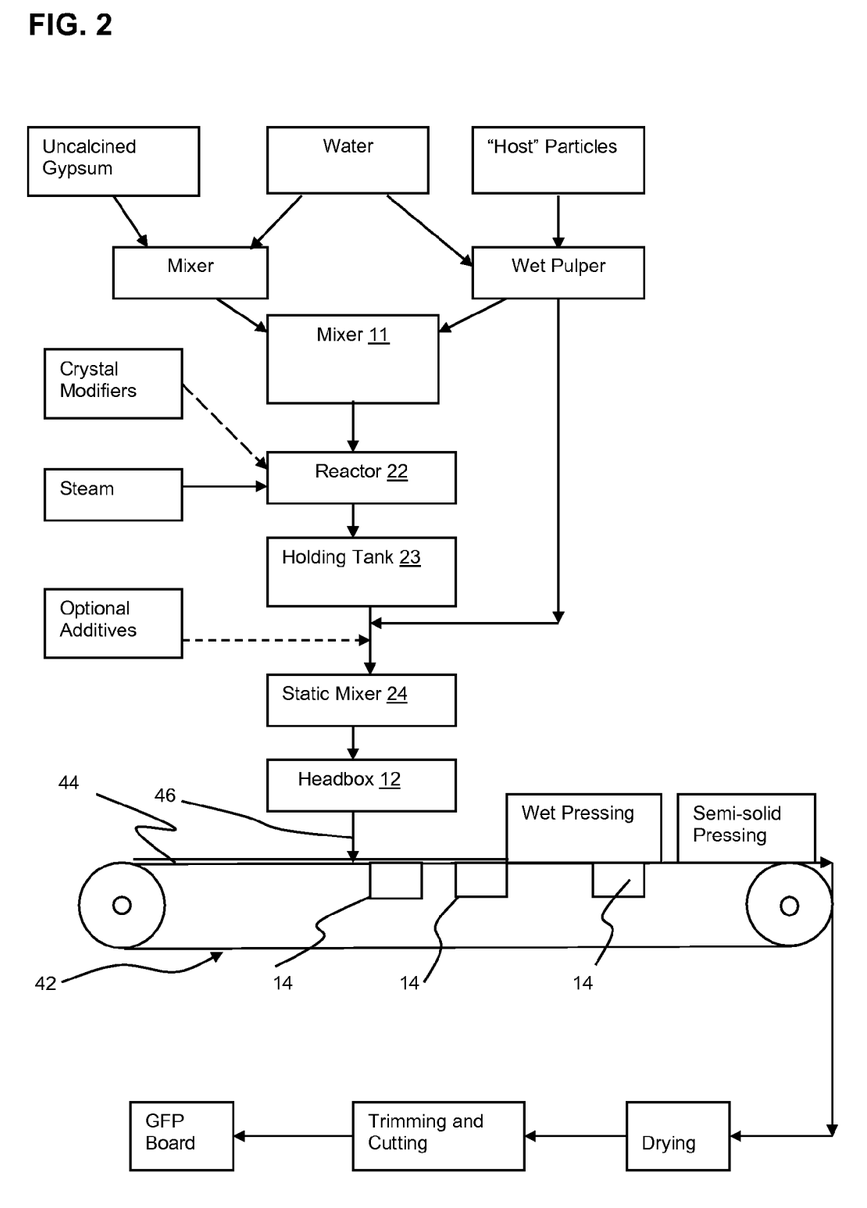
FIG. 2 is a schematic diagram of an embodiment of the method of producing the gypsum fiber board panel of the invention.

According to a preferred embodiment of the invention, the host particle is a paper fiber. Referring to FIG. 2, the paper is first pulped and then mixed with water to form slurry containing about 3% to 4.5%, by weight (based on the total solids). Ground, uncalcined gypsum is also mixed with enough water in a mixer to form slurry having about 65%-85% by weight water. The slurries of ground gypsum and pulped paper are then blended together in another mixer 10 to form a homogeneous slurry before being sent to a pressure vessel (reactor system) 22. The slurry is heated in the pressure vessel (reactor system) at a temperature sufficient to convert the gypsum to calcium sulfate hemihydrate. It is desirable to continuously agitate the slurry in the pressure vessel with gentle stirring or mixing to break up any fiber clumps and keep all the particles in suspension. In the pressure vessel the hemihydrate precipitates out of solution and forms acicular alpha hemihydrate crystals. Then the pressure on the product slurry is relieved when the slurry is discharged from the reactor system, to a holding tank 23. The balance of the "host" fibers ("pulped paper"), i.e. the second portion of paper fibers is added to the gypsum fiber slurry along with other optional ingredients in a static mixer 24. The host fibers are typically paper fibers. The added ingredients can include selected process modifying or property enhancing additives, such as accelerators, retarders, weight reducing fillers, water resistance additives, etc. While still hot, the resulting product slurry 46 from static mixer 24 is discharged through a head box 12 onto a continuous felting conveyor 42, such as the type used in paper making operations, to form a filter cake and remove as much uncombined water as possible. As much as 90% of the water can be removed from the filter cake by the felting dewatering conveyor 42. As a consequence of the water removal and air pulled through the formed mat through vacuum boxes 14, the filter cake is cooled to a temperature at which rehydration may begin. However, it may still be necessary to provide additional external cooling to bring the temperature low enough to accomplish the rehydration within an acceptable time.

Before extensive rehydration takes place, the filter cake is preferably consolidated into a board of desired thickness and/or density. If the board is to be given a special surface texture or a laminated surface finish, it would preferably occur during or following this step of the process. During the wet pressing, which preferably takes place with gradually increasing pressure to preserve the product's integrity, additional water, e.g. about 50-60% of the remaining water, is removed. The mat is then further pressed in a semisolid dry pressing step. As a consequence of the additional water removal, the filter cake is further cooled to a temperature at which rapid rehydration occurs. The calcium sulfate hemihydrate hydrates to gypsum, so that the acicular calcium sulfate hemihydrate crystals are converted to gypsum crystals in situ in and around the cellulose fibers. After some rehydration, the boards can be dried in a kiln and then cut and trimmed, if desired. Preferably, the drying temperature should be kept low enough to avoid recalcining any gypsum on the surface The cellulose fibers are uniformly distributed in the gypsum cellulose fiber slurry. Although it is preferred that the cellulose fibers be added to the slurry at the static mixer prior to the headbox, the cellulose fibers may be added to the gypsum fiber slurry in the headbox provided that the fibers are uniformly dispersed in the product slurry 46 prior to being deposited on the conveyor 42.

The process of the present invention has been found to be able to reduce the amount of the total cellulose fiber added to the gypsum in the calcination stage of the process by 50% up to about 70% of the total added cellulose fiber or, about 3 wt % to about 4.5 wt % cellulose fibers. The balance of the cellulose fiber is added after calcination. without reducing the properties of the gypsum cellulose fiber board. The process reduces the total energy requirement for calcination by at least about 35 to 40% or more and the calcination time to about 15-18 minutes, and unexpectedly also reduces the setting time of the gypsum fiber board panel (GFP) without reducing the properties of the gypsum fiber board.

The process of this invention also allows for the increased amount of calcined gypsum and reduced amounts of high grade paper or cellulose fibers in the calcination process without loss of the structural properties of gypsum fiber board required in the industry.

As previously discussed, there is a need for building panels that are lighter in weight and are capable of replacing currently available gypsum fiber board panels which suffer from the following deficiencies: heavy product density, inferior toughness performance, poor handelability during installation.

DETAILED DESCRIPTION OF THE PREFERRED EMBODIMENTS

A. The Panel

Figure 1:
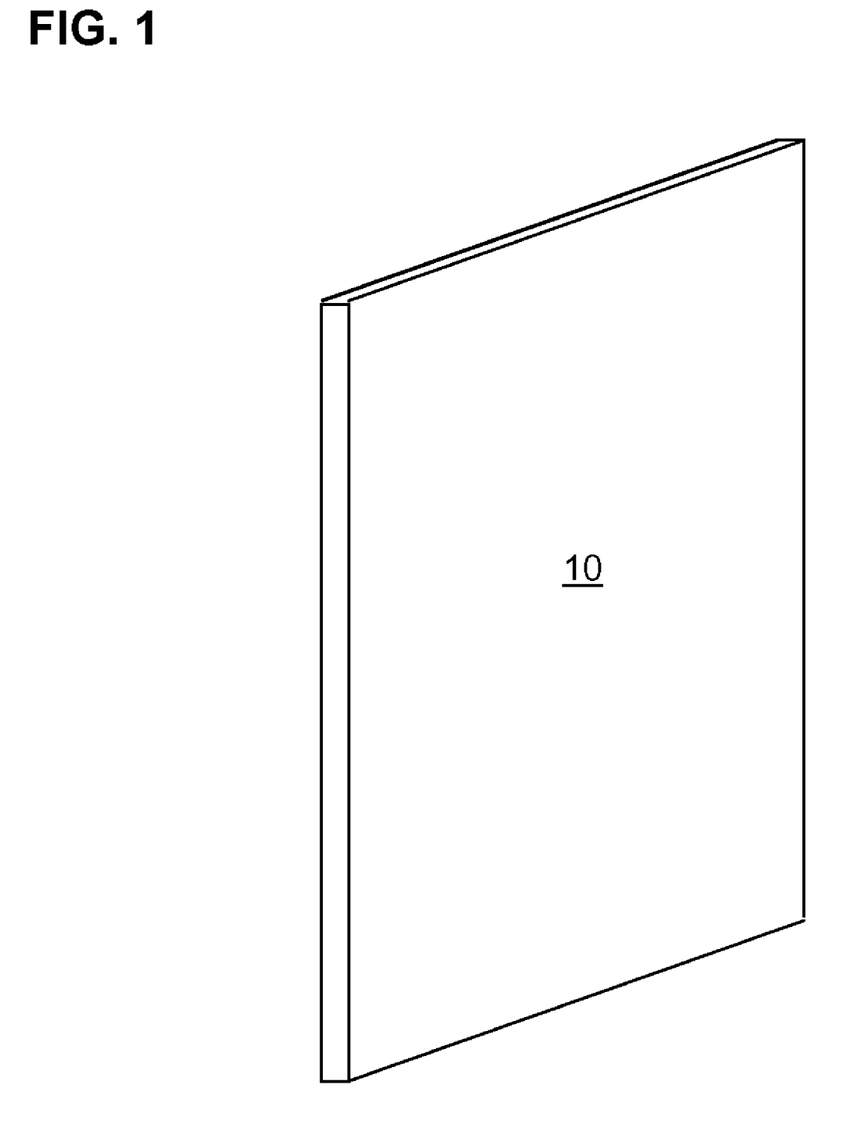
FIG. 1 is a diagram of a perspective view of an embodiment of the gypsum cellulose fiber panel 10 of the present invention.

The present invention relates to a reinforced, dimensionally stable gypsum cellulose fiber board panel. FIG. 1 shows a perspective view of a panel 10 of the present invention.

The panel includes a continuous phase resulting from the curing of an aqueous mixture of gypsum and cellulosic fibers, the panel comprising, on a dry basis, 95-70 wt. % gypsum, 5-10 weight % cellulosic fiber, and about 0 to 3 weight % unhydrated hemihydrate ("UHH").

The principal starting materials used to make panels of the invention are inorganic binder, e.g., alpha calcium sulfate alpha hemihydrate, cellulosic fiber from "host particle", water, and optional additives as well as the added cellulose fiber added to the calcined gypsum slurry before the slurry is formed into a mat.

In many applications, for example in siding, the panels will be nailed or screwed to vertical framing.

Another feature of the present invention is that the resulting GFP panel is constructed so that the added cellulose fibers are uniformly distributed throughout the panel. The percentage of fibers relative to the weight of the final product preferably constitutes approximately in the range of 6% to 10%, for example 6 wt. %.

Other methods of depositing a mixture of the slurry and adding cellulose fibers will occur to those familiar with the panel-making art. For example, rather than using the present continuous process of making panel on a continuous sheet, a batch process could also be used to make panels in a similar manner, which after the material has sufficiently set, can be cut into panels of the desired size.

B. Formulation

The components used to make the panels of the invention are calcium sulfate dihydrate, paper or other cellulose fibers, alpha calcium sulfate alpha hemihydrate, and water. Small amounts of binders, accelerators and/or retarders may be added to the composition to control the setting characteristics of the green (i.e., unhydrated) material. Typical non-limiting additives include accelerators for alpha calcium sulfate hemihydrate such as gypsum.

Panels of the invention include a continuous phase in which some of the cellulose fibers are uniformly distributed. As shown in FIG. 2, the continuous phase results from the curing of an aqueous mixture of the calcined gypsum and cellulose fibers from a pressurized reactor and an aqueous slurry of additional cellulose fibers introduced into the gypsum fiber slurry after it leaves the reactors and immediately prior to a slurry headbox, where it is fed to the forming belt at a temperature of about 180°-200° F. at atmospheric pressure.

Typical broad weight proportions of embodiments of the formulations of the invention, based on dry weight, are shown in TABLE 1, below.

TABLE 1

| TYPICAL MIXTURE WEIGHT PROPORTION (DRY BASIS) | BROAD RANGE WT. % | TYPICAL RANGE WT. % | MORE TYPICAL RANGE WT. % |
|---|---|---|---|
| Gypsum | 70-95 | 90-94. | 90-92 |
| Cellulose Fibers Added To GYPSUM BEFORE CALCINATION | 2-15 | 3-5 | 3-4.5 |

TABLE 1-continued

| TYPICAL MIXTURE WEIGHT PROPORTION (DRY BASIS) | BROAD RANGE WT. % | TYPICAL RANGE WT. % | MORE TYPICAL RANGE WT. % |
|---|---|---|---|
| CELLULOSE FIBER ADDED TO SLURRY AFTER LEAVING CALCINATION REACTOR | 3-15 | 3-5 | 3-4.5 |
| TOTAL Cellulose Fiber | 5-30 | 6-10 | 8-9 |
| UHH | 5.0-10.0 | 0.0-3.0 | 0.0-3.0 |
| Additives | 1.0 | 1.0 | 1.0 |
| Totals | 100 | 100 | 100 |

In the first embodiment of the invention, the dry ingredients of the composition will be gypsum and cellulose fibers and the wet ingredients of the composition will be water. The dry ingredients and the wet ingredients are combined to produce the panel of the invention. The cellulose fibers added to the gypsum cellulose fiber leaving the reactor are uniformly distributed in the matrix throughout the full thickness of the panel. Of the total weight of dry ingredients, the panel of the invention is typically formed from about 90 to 95 wt. % gypsum and 5-10 wt. % cellulosic fiber, with a first portion of cellulose fiber being added before the calcination and a second portion of cellulose fiber, typically at least half of the total cellulose fibers in the final panel being added after the gypsum cellulose slurry emerges from the reactor. In a typical commercial embodiment, the panel would be formed from about 90 to 92 wt. % gypsum and about 8 to 10 wt. % cellulose fiber, on a dry ingredient basis.

1. Calcium Sulfate Hemihydrate

Calcium sulfate hemihydrate, which may be used in panels of the invention, is made from gypsum ore, a naturally occurring mineral, (calcium sulfate dihydrate $CaSO_4 \cdot \frac{1}{2} H_2O$) or other chemical byproduct sources. Unless otherwise indicated, "gypsum" will refer to the dihydrate form of calcium sulfate. The raw gypsum is thermally processed to form a settable calcium sulfate, but more typically is the hemihydrate, $CaSO_4 \cdot \frac{1}{2} H_2O$. For the familiar end uses, the settable calcium sulfate reacts with water to solidify by forming the dihydrate (gypsum). The hemihydrate has two recognized morphologies, termed alpha hemihydrate and beta hemihydrate. These are selected for various applications based on their physical properties and cost. Both forms react with water to form the dihydrate of calcium sulfate, typically with large aspect ratio. The alpha hemihydrate forms more dense microstructures having higher strength and density than those formed by the beta hemihydrate. This may be due to the fact that alpha hemihydrate requires less water to form a flowable slurry, thereby resulting in a denser cast and greater strength. Thus, the alpha hemihydrate could be substituted for beta hemihydrate to increase strength and density or they could be combined to adjust the properties.

A typical embodiment for the inorganic binder used to make panels of the present invention comprises a blend containing alpha calcium sulfate hemihydrate and lignocellulosic fiber from paper, such as Kraft paper, waste paper, etc.

2. "Host Particle"

The term host particle is meant to cover any macroscopic particle as a fiber, a chip, or a flake, of a substance other than gypsum. The particle, which is generally insoluble in the slurry liquid, should also have accessible voids therein; whether pits, cracks, fissures, hollow cores, or other surface imperfections, which are penetrable by the slurry menstruum and within which calcium sulfate crystals can form. It is also desirable that such voids are present over an appreciable portion of the particle; because the more and better distributed the voids, the greater and more geometrically stable will be the physical bonding between the gypsum and host particle. The substance of the host particle should have desirable properties lacking in gypsum, and preferably at least higher tensile and flexural strength. A ligno-cellulosic fiber, particularly a paper fiber, is an example of a host particle especially well suited for the composite material and process of the invention. Therefore, without intending to limit the material and/or particles that are suitable as host particles, paper fiber is often used hereinafter for convenience in place of the broader term.

3. Gypsum/Cellulose Fiber

The term gypsum fiberboard or gypsum fiber panel (GFP), as used herein is meant to cover mixtures of gypsum and host particles including cellulose fibers, e.g. paper fibers, which are used to produce boards wherein at least a portion of the gypsum is in the form of acicular calcium sulfate dihydrate crystals positioned in the voids of the host particles, wherein the dihydrate crystals are formed in situ by the hydration of acicular calcium sulfate hemihydrate crystals in and about the voids of the particles. The gypsum fiber boards are produced by a process shown in FIG. 2, which is a modified process from the original process of making a gypsum fiberboard in U.S. Pat. No. 5,320,677.

Typically the paper fibers are available in the large pieces that are wet pulped into a uniform slurry of about 4% by weight solids.

B. Making a Panel of the Present Invention

1. Mixing Slurry

A method for making the composite wallboard of the present invention is illustrated in the diagram of FIG. 2.

The process begins by mixing uncalcined gypsum and host particles (e.g. paper fibers) with water to form dilute aqueous slurry. The source of the gypsum may be from raw ore or from the by-product of a flue-gas desulphurization or phosphoric acid process. The gypsum typically should be of 82-98% purity, and typically be finely ground, for example, to 92-96%-minus 100 mesh or smaller. Larger particles may lengthen the conversion time. The gypsum can be introduced either as a dry powder or via aqueous slurry.

The invention co-calcines gypsum and cellulose fiber slurry by any suitable process. A typical process for making such composite slurry is disclosed by U.S. Pat. No. 5,320,677, incorporated herein by reference in its entirety. The present process provides a gypsum cellulose fiber layer with added cellulose fiber on a forming screen 44 on dewatering conveyor 30 using GFD fiber slurry through a head box 12 and dewaters it using a vacuum station 14 to provide a layer of gypsum paper fiber slurry on the porous forming belt (screen) 42.

Referring again to FIG. 2, the basic process begins by mixing ground uncalcined gypsum with water to form a first slurry, pulping paper with water to form a uniform slurry and combining the two slurries in a mixer 11 equipped with an agitator (not shown) to form a dilute aqueous slurry. The source of the gypsum typically may be from raw ore or from the by-product of a flue-gas-desulphurization. The gypsum should be of a relatively high purity, i.e., preferably at least about 92-96%, and finely ground, for example, to 92-96% minus 100 mesh to minus 200 mesh or smaller. Larger particles may lengthen the conversion time. The gypsum is typically introduced as an aqueous slurry.

The host particle is preferably a cellulosic fiber which may come from waste paper, wood pulp, wood flakes, and/or another plant fiber source. It is preferable that the fiber be one that is porous, hollow, split and/or rough surfaced such that its physical geometry provides accessible interstices or voids which accommodate the penetration of dissolved calcium sulfate. In any event the source, for example, wood pulp, may also require prior processing to break up clumps, separate oversized and undersized material, and, in some cases, pre-extract strength retarding materials and/or contaminants that could adversely affect the calcination of the gypsum; such as hemi-celluloses, acetic acid, etc.

The ground gypsum slurry, which is typically 40% by weight solids, and the cellulose fiber e.g. paper fiber slurry, which is typically at about 4% consistency, are mixed together with sufficient water to form a composite slurry typically containing about 15-35% by weight solids. The solids in the slurry should comprise from about 0.5% to 5.0% by weight of cellulose fibers and the balance being mainly gypsum.

2. Conversion to Hemihydrate

The slurry is fed into a pressure vessel(s) or autoclave(s) 22 equipped with a continuous stirring or mixing device. Crystal modifiers, such as organic acids, can be added to the slurry at this point, if desired, to stimulate or retard crystallization or to lower the calcining temperature. Steam is injected into the reaction vessel 22 to bring the interior temperature of the vessel up to between about 100° C. (212° F.) and about. 177° C. (350° F.), and up to 70 psig for saturated steam; the lower temperature being approximately the practical minimum at which the calcium sulfate dehydrate will calcine to the hemihydrate state within a reasonable time; and the higher temperature being about the maximum temperature for calcining hemihydrate without risk of causing some the calcium sulfate hemihydrate to convert to anhydrite. The reaction vessel temperature is preferably on the order of about 140° C. (285° F.) to 152° C. (305° F.).

When the slurry is processed under these conditions for a sufficient period of time, for example on the order of 18 to 23 minutes, enough water will be driven out of the calcium sulfate dihydrate molecule to convert it to the hemihydrate molecule. The solution, aided by the continuous agitation to keep the particles in suspension, will wet out and penetrate the open voids in the host particles. As saturation of the solution is reached, the hemihydrate will nucleate and begin forming crystals in, on and around the voids and along the walls of the host fibers.

The first significant improvement of the current process is that when only half of the cellulose fiber used is added to the reactor to co-calcine with the gypsum, the amount of steam required to calcine the mixture is reduced by 30-40% or more of that used when all of the cellulose fiber is added prior to the reactor 22.

It is believed that during the autoclaving reaction operation, the dissolved calcium sulfate penetrates into the voids in the cellulose fibers and subsequently precipitates as acicular hemihydrate crystals within, on and about the voids and surfaces of the cellulose-fibers. When the conversion is complete, the pressure on the autoclave is reduced, any desired additives, including wax emulsion, can be introduced, typically at or before the head box 12, and the slurry 46 is discharged onto a traveling porous belt 44 of a dewatering conveyor 42. The additional cellulose fibers are typically added to the gypsum cellulose slurry at this point in the process after the slurry leaves the reactor 22 and the holding tank 23 is introduced into a static mixer 24. The mixed gypsum cellulose slurry including the second portion of added cellulose fiber from the wet pulper and any optional additives are then fed into the headbox 12. Conventional additives including accelerators, retarders, preservatives, fire retardants, water resistant core additives and strength enhancing agents may be added to the slurry prior to the static mixer 24 and headbox 12 before the combined slurry 46 from the headbox 12 is deposited on the belt 44.

3. Dewatering

The added cellulose fiber and calcined gypsum fiber slurry 46 is passed through the head box 12 which distributes the slurry onto the surface of the flat porous belt 44 to produce a filter cake. The filter cake is dewatered by the water in the slurry passing through the porous belt surface 44, preferably aided by vacuum from vacuum stations 14. Although the dewatering causes cooling of the filter cake, additional external cooling may be applied during the dewatering step. As much of the water is removed as possible through pressing through rollers in the wet pressing while the temperature of the product slurry is still relatively high and before the hemihydrate is substantially converted into gypsum. As much as 90% of the slurry water is removed in the dewatering device, leaving a filter cake of approximately 35% water by weight. At this stage the filter cake preferably consists of cellulose fibers interlocked with rehydratable calcium sulfate hemihydrate crystals and can still be broken up into individual composite fibers or nodules, shaped, cast, or compacted to a higher density.

4. Pressing and Rehydration

The dewatered filter cake is preferably first wet-pressed using suction rolls (not shown) and then presses in a semi-solid pressing step to further reduce the water content and to compact the filter cake into the desired shape, thickness and/or density before substantial rehydration of the hemihydrate occurs. Although the extraction of the bulk of the water in the dewatering step will contribute significantly to lowering the filter cake temperature, additional external cooling may be required to reach the desired rehydration temperature within a reasonable time. The temperature of the filter cake is preferably reduced to below about 49° C. (120° F.) so that relatively rapid rehydration can take place. The rehydration recrystallizes the alpha hemihydrate crystals into acicular gypsum crystals in place, physically interlocked with the cellulose fibers.

Depending on the accelerators, retarders, crystal modifiers, or other additives provided in the slurry, hydration may take from only a few minutes to an hour or more. Because of the interlocking of the acicular crystals with the cellulose fibers, and the removal of most of the carrier liquid from the filter cake, migration of the calcium sulfate is averted, leaving a homogeneous composite. The rehydration effects recrystallization of the hemihydrate crystals to dihydrate crystals in situ, i.e. within and about the voids of the cellulose fibers, thereby preserving the homogeneity of the composite. The crystal growth also connects the calcium sulfate crystals on adjacent fibers to form an overall crystalline mass, enhanced in strength by the reinforcement of the cellulose fibers.

When the hydration is complete, it is desirable to promptly dry the composite mass to remove the remaining free water in order to develop maximum physical properties.

5. Drying

The pressed board, which typically contains about 30% by weight of free water, is then promptly dried at a relatively high temperature in order to reduce the free water content to about 0.5% or less in the final product. Obviously, drying conditions which tend to calcine the gypsum should be avoided. It has been found that it is desirable to carry out the drying under conditions in which the product achieves a core temperature of no more than 93.3° C. (200° F.), preferably no more than about 74° C. (165° F.), so that recalcination of the gypsum does not occur. The set and dried board can be cut and otherwise finished to desired specification.

When finally set, the unique composite material exhibits desired properties contributed by both of its two components. The cellulose fibers increase the strength, particularly flexural strength, of the gypsum matrix, while the gypsum acts as a coating and binder to protect the cellulose fiber, impart fire resistance and decrease expansion due to moisture.

In the modified process of this invention, the calcined gypsum cellulose fiber slurry from headbox 12 of the process is deposited on the continuous porous belt 44 of the conveyor 42. The cellulose fiber and GFP slurry 46 is dewatered through use of the vacuum stations 14 as it passes through a wet pressing which consists of suction rolls, and a porous belt, and then a semi-solid pressing to further dewater and consolidate the mat under the combined effect of vacuum and pressure to a moisture content (wet basis) of 23-35% (30-55% on a dry basis). The spacing between the primary wet pressing and a secondary semi-solid pressing is used to impart smoothness, depending upon the belt surface used. The semi-solid pressing also decreases thickness variation by setting it at a fixed-gap nip slightly less than the desired end result board thickness.

The GFP production process forms panels at a temperature of about 93.3° C. (200° F.) at a moisture content of about 25% to about 35%, wet basis after dewatering. The higher gypsum solids content of the gypsum cellulose fiber mixture reacted in the calcining reaction in the present process versus the higher fiber content used in earlier gypsum-cellulose fiber processes has allowed the calcining process to be operated on significantly reduced amount of steam, e.g. about 30-40% less steam, while essentially eliminating all unreacted hemihydrate that can not be rehydrated to gypsum in the final formation of the GFP panel.

The gypsum cellulose fiber crystals emerging from the reactor are slightly more elongated and have a higher aspect ratio or surface area than the crystals prepared in the prior art process when all of the cellulose fibers were co-calcined with the gypsum. The modified crystals along with the reduction of unhydrated hemihydrate ("UHH") from up to 30% in the prior art process to an average of about 10% UHH and in at least a couple of instances with products that do not contain a siloxane, essentially 0% UHH. This reduction in UHH in the current process is believed to result in the noted decrease in required setting time of the resulting gypsum fiberboard, which has reduced the setting time from the best current range of 30-40 minutes to about 16-25 minutes during plant trial runs when half of the fiber e.g. 4.0-4.5% fiber is added after the calcination process. Since the production process is dependent upon the setting time of the formed panel, this reduction has a very pronounced increase in the production line speed and panel production rate.

Panel Properties

Panels of the present invention typically have the following additional properties:

The density of the panel of the current invention is essentially the same as a conventionally prepared gypsum cellulose fiberboard where all of the paper fiber is added prior to calcination. However, it is possible to lower the density of the present gypsum fiberboard when more fiber is added after calcination if this is desired.

TABLE 2 provides a description of the target mixture compositions for the following examples. The weight fractions of various ingredients shown in this table are for the wet slurry.

TABLE 2

Target gypsum fiber mixture composition of examples

| Ingredient | (Dry Basis Weight %) |
|---|---|
| Gypsum | 90.0-93.0% |
| cellulose fiber | 7.0-10.0% |
| Additional Additives[1] | up to 3.0% |
| Total | 100% |

[1]Additional additives include setting accelerators, crystal modifiers and water resistant additives such as wax about 1-2%) and siloxane (about 1.0%)

The panels were made as described in the section entitled "Making A Panel Of The Invention"

EXAMPLE 1

Extended trials were conducted on a commercial GFP production line modified to add a first portion of paper cellulose fiber to a gypsum slurry before being fed to reactor 22 and a second portion of paper cellulose fiber added to the slurry after reaction in reactor 22. The first portion of fibers was added in an amount of 4.5 wt % on a dry basis to an aqueous slurry of gypsum that is mixed before being fed into the reactor 22. The overall slurry consistency was 25%, which was a substantial increase compared to a typical level of 16% to 18% for conventional slurries with 8.5 wt % fiber. Consistency, which is also known as "water demand" is a term of art and is determinable according to ASTM Procedure C472, or its substantial equivalents. It is defined as the amount of water in grams per 100 grams of stucco. Consistency for purposes of gypsum board manufacture may be defined as the water volume required giving a standard viscosity or flow when 100 grams of stucco is dispersed by mechanical mixing in a laboratory high speed blender at high shear intensity and for 7 seconds which is equivalent to the mixing encountered in the board forming line. The particular numerical value is variable from one process to the next depending on the particular stucco and the rate of production.

The increased slurry consistency resulted in a reduction in the steam demand of approximately 38 to 40% from the level of steam normally required for the duration of the production run. The reduction in fiber content in the slurry in the reactor also improved calcination and created alpha crystals that were thinner and with a higher aspect ratio as compared to those from a conventional production run with 8.5 wt % paper cellulose slurry fed to the reactor. The time required for calcination of the gypsum and paper fiber slurry ranged from as little as 15 minutes to about 25 minutes, with commercial production trials being adjusted for the particular production line to give a calcination reaction time within the range of about 18 to 22 minutes. This is a significant reduction from the time required to calcine the gypsum and all of the paper fiber in the slurry used in the standard production process.

The resulting calcined gypsum/fiber slurry was pumped to a fourdinier style headbox along with a stream of additional pulped fiber to give a total fiber content of about 10 wt %. The composite slurry was then deposited on a porous forming fabric and was then dewatered through the porous forming fabric with the use of vacuum boxes 14, followed by additional vacuum applied in combination with pressure to further consolidate the mat. Rehydration was then begun and after a portion of the rehydration had occurred, additional pressing was used to produce a panel with the desired thickness and surface appearance. The setting time for the panels was in the range of as low as about 15 minutes to about 25 minutes, compared to the standard production process that requires over 28 minutes. Following completion of rehydration, the panels were loaded into a kiln to dry the panel and remove any remaining free moisture. The resulting panel had 90 to 92 wt % gypsum and essentially no unhydrated hemihydrate.

EXAMPLE 2

The trial of example 1 was repeated with a trial run of about one hour with the use of about 3.25 wt. % paper cellulose fiber in the first portion added to aqueous slurry of gypsum that is mixed before being fed to the reactor for co-calcination. The overall consistency of the slurry was 25%-28%. The overall increase in consistency resulted in a reduction of steam energy required to calcine the slurry of over about 45% was achieved relative to the amount of steam required to calcine the slurry with conventional 8 to 10% cellulose fiber in the reactor. The calcination time was reduced to about 16-22 min.

The resulting calcined gypsum/fiber slurry was pumped to a fourdinier style headbox along with a stream of a second portion of pulped fiber to that was added to give a total fiber content of about 10 wt %. The composite slurry was then deposited by the headbox onto a porous forming fabric and then dewatered through the porous forming fabric with the use of vacuum boxes 14, followed by additional vacuum applied in combination with pressure to further consolidate the mat. Rehydration was then begun and after a portion of the rehydration had occurred, additional pressing was used to produce a panel with the desired thickness and surface appearance. Following completion of rehydration, the panels were loaded into a kiln to dry the panel and remove any remaining free moisture. The resulting panel had 90 to 92 wt % gypsum and essentially no unhydrated hemihydrate.

The amount of the first portion of the cellulose fiber reacted with gypsum in the co-calcination reaction of the process of this invention can be reduced to about 3.0 to 4.5 wt % of the slurry. The first portion is generally up to 50% of the total added cellulose fiber, e.g. about 3 to 5 wt % additional benefits in the reduction of energy required to complete the calcination reaction, reduction of panel final setting time and reduction in the amount of unhydrated hemihydrate in the final panel do not increase if the first portion of added cellulose fiber is more than about 70% of the total added cellulose fiber in the calcination reaction. Moreover the reduction of the cellulose fiber in the calcination reaction below about 3 wt % cellulose fiber reduces the amount of the co-calcined gypsum and "the host" cellulose crystalline structure without significantly reducing the steam energy requirements or setting time. In fact it has been noted that the reduction of fiber content in the calcination stage to a level of 50% to 70% of the total added fiber has resulted in a reduction in the rate of dewatering with the crystalline structure unless a drainage aid is also used. Thus although it is possible to further reduce the amount of cellulose fiber added in the first portion to the gypsum in the calcination stage, the benefits of the reduction below about 50 to 70% are not commercially significant in terms of the process improvements and the estimated reduction of steam energy above about 50% will require the use of addition drainage aids and crystal modifiers to retain desired setting times and crystalline properties of the co-calcined product GFP product originally disclosed and claimed in U.S. Pat. No. 5,320,677 to Baig.

While particular embodiments of the present invention have been shown and described, it will be appreciated by those skilled in the art that changes and modifications may be made thereto without departing from the invention in its broader aspects and as set forth in the following claims.

We claim:

1. A method of making a gypsum fiberboard panel comprising:
   providing an aqueous slurry comprising gypsum and a first portion of cellulose fibers to a reactor, reacting the gypsum and a first portion of cellulose fiber in the reactor to produce a calcined crystalline gypsum and cellulose fiber slurry,
   uniformly reinforcing the calcined crystalline gypsum and cellulose fiber slurry with a second portion of cellulose fiber after the reacting step to form a second slurry,
   depositing the second slurry to form a mat,
   dewatering the mat,
   rehydrating the mat to form a gypsum cellulose fiber mat, and then drying, cutting and finishing the mat into a final gypsum fiberboard panel,
   wherein no more than one half of the total cellulose fiber in the final gypsum fiberboard panel is added in the first portion to the reactor for calcination with the gypsum and wherein the amount of steam energy used in the reactor to calcine the gypsum and fiber is about 40% to 50% less than when all of the total cellulose fiber is added in the first portion to the reactor, and
   wherein the amount of unhydrated hemihydrate in the final gypsum fiberboard panel is reduced by more than 50% from the level of unhydrated hemihydrate in a panel made with a slurry with all of the cellulose fiber calcined with the gypsum.

2. The method of claim 1 wherein the final panel contains 0.0 to 3.0 weight % unhydrated hemihydrate.

3. The method of claim 1 wherein the gypsum supplied to the reactor is in the form of an aqueous slurry and the first portion of cellulose fiber that is added to the reactor is also in the form of an aqueous slurry and the two slurries are blended together before entering the reactor.

4. The method of claim 3 wherein the second portion of cellulose fiber is also added to the calcined gypsum and cellulose fiber slurry in the form of an aqueous slurry.

5. The method of claim 1 wherein the first portion of cellulose fiber is about 3.0 wt % to 4.5 wt % of the aqueous slurry on a dry basis prior to the reacting step.

6. The method of claim 1 wherein the total cellulose fiber content of the gypsum fiberboard panel is about 8% to 10% by weight.

7. The method of claim 1 wherein the consistency of the gypsum and cellulose fiber slurry in the reactor is about 25% to 30% by weight.

8. The method of claim 1 wherein about 50 wt % to 70 wt % of the total cellulose fiber is added as the second portion to the calcined gypsum and cellulose fiber slurry after the slurry leaves the reactor.

9. The method of claim 1 wherein the mat formed sets within about 15-25 minutes of formation and rehydration.

10. The method of claim 9 wherein the time required to calcine the gypsum and first portion of cellulose fiber is about 18 to 22 minutes.

11. The method of claim 1 wherein the time for calcining the gypsum and first portion of cellulose fiber is about 15 to 25 minutes.

12. The method of claim 1 wherein the final gypsum fiberboard panel is more flexible and has a density less than panels made from the same ingredients wherein all of the cellulose fiber is reacted with gypsum in the reactor.

13. The method of claim 1 wherein the density of the final gypsum fiberboard panel is about 53 to 70 pounds per cubic foot.

14. The method of claim 1 wherein the final gypsum fiberboard panel comprises, on a dry basis, 90-94 wt. % gypsum, 6-10 weight % cellulosic fiber and about 0.0 to 3.0 weight % of unhydrated hemihydrate.

15. The method of claim 14, wherein the final gypsum fiberboard panel comprises, on a dry basis, 94 to 92 wt. % gypsum and 6-8 wt. % cellulose fibers.

16. The method of claim 1 wherein a continuous phase of the final gypsum fiberboard panel comprises a co-calcined gypsum cellulose fiber crystalline slurry which is uniformly reinforced with cellulose fibers added in a second portion to the calcined gypsum cellulose fiber crystalline slurry after the calcination step.

17. The method of claim 1, wherein the final gypsum fiberboard panel has a thickness of about 6.3 to 15.9 mm (0.25 to 0.625 inches).

18. A method of improving the moisture expansion properties of gypsum fiberboard comprising:

providing an aqueous slurry comprising gypsum and a first portion of cellulose fibers to a reactor, reacting the gypsum and a first portion of cellulose fiber in the reactor to produce a calcined crystalline gypsum and cellulose fiber slurry, uniformly reinforcing the calcined crystalline gypsum and cellulose fiber slurry with a second portion of cellulose fiber after the reacting step to form a second slurry, depositing the second slurry to form a mat, dewatering the mat, rehydrating the mat to form a gypsum cellulose fiber mat, and then drying, cutting and finishing the mat into a final gypsum fiberboard panel, wherein no more than one half of the total cellulose fiber in the final gypsum fiberboard panel is added in the first portion to the reactor for calcination with the gypsum and wherein the amount of steam energy used in the reactor to calcine the gypsum and fiber is about 40% to 50% less than when all of the total cellulose fiber is added in the first portion to the reactor, and wherein the amount of unhydrated hemihydrate in the final gypsum fiberboard panel is reduced by more than 50% from the level of unhydrated hemihydrate in a panel made with a slurry with all of the cellulose fiber calcined with the gypsum.

* * * * *